United States Patent
Faust et al.

[11] Patent Number: 6,004,894
[45] Date of Patent: Dec. 21, 1999

[54] REFLECTIVE PORCELAIN ENAMEL COATING COMPOSITIONS

[75] Inventors: William D. Faust, Aurora; Holger F. Evele, Brecksville, both of Ohio

[73] Assignee: Ferro Corporation, Cleveland, Ohio

[21] Appl. No.: 09/181,687

[22] Filed: Oct. 28, 1998

Related U.S. Application Data

[63] Continuation of application No. 08/926,260, Sep. 5, 1997, abandoned.

[51] Int. Cl.$^6$ .............. C03C 1/00; C03C 1/04; C03C 3/076; C03C 3/091; C03C 8/14

[52] U.S. Cl. .............. 501/17; 501/16; 501/21; 501/24; 501/25; 501/26; 501/32; 501/57; 501/58; 501/59; 501/63; 501/64; 501/67; 501/69; 501/70; 501/72; 501/77; 501/78; 501/79; 501/65; 501/66

[58] Field of Search .............. 501/16, 17, 21, 501/24, 25, 26, 32, 59, 63, 64, 67, 70, 72, 79, 57, 58, 69, 77, 78, 65, 66

[56] References Cited

U.S. PATENT DOCUMENTS

| | | | |
|---|---|---|---|
| 3,836,373 | 9/1974 | Ault et al. | 106/48 |
| 3,841,986 | 10/1974 | Rion et al. | 204/181 |
| 3,928,668 | 12/1975 | Snow | 427/14 |
| 4,085,021 | 4/1978 | van der Vliet | 204/181 N |
| 4,110,487 | 8/1978 | Rion | 427/27 |
| 4,204,021 | 5/1980 | Becker | 428/325 |
| 5,002,903 | 3/1991 | Lim et al. | 501/26 |
| 5,296,415 | 3/1994 | Podestá | 501/25 |
| 5,326,728 | 7/1994 | Boury et al. | 501/17 |
| 5,382,552 | 1/1995 | Saad et al. | 501/25 |
| 5,633,090 | 5/1997 | Rodek et al. | 428/428 |
| 5,650,364 | 7/1997 | Münstedt et al. | 501/21 |
| 5,679,144 | 10/1997 | Thiel et al. | 106/35 |

*Primary Examiner*—Michael Marcheschi
*Attorney, Agent, or Firm*—Rankin, Hill, Porter & Clark LLP

[57] ABSTRACT

The present invention provides a porcelain enamel coating composition for use in forming a coating composition upon a metal substrate having an infrared reflectivity of at least 50% at 2.5 μ-microns measured with a Perkin Elmer Lambda 19 UV/VIS/NIR spectrometer with a labsphere RSA-PE 19 reflectance spectroscopy accessory. The coating composition comprises a glass component and a separate and distinct addition of cerium oxide. Preferably, the coating composition comprises from about 0.20% to about 3.0% by weight of the cerium oxide.

11 Claims, No Drawings

REFLECTIVE PORCELAIN ENAMEL COATING COMPOSITIONS

RELATED APPLICATIONS

This application is a continuation application of application Ser. No. 08/926,260 filed Sep. 5, 1997 entitled "Reflective Porcelain Enamel Coating Composition now abandoned."

FIELD OF INVENTION

The invention concerns a coating composition for use in forming a reflective coating on heating devices such as food cooking ovens. More particularly, the present invention concerns a new porcelain enamel coating composition that displays excellent infrared reflectivity.

BACKGROUND OF INVENTION

In certain oven cooking applications it is advantageous to have a coating on the inside of the oven cavity that reflects radiant energy. Unfortunately, most coating materials exhibit characteristics which are not ideal for the reflection of radiant energy or energy characterized by infrared radiation. Generally, the absorption characteristics of most coatings have not been engineered to achieve a high degree of reflectivity. Additionally, the matrix or body of the coating may have an overriding effect on the reflectivity of the coating.

Enhanced thermal reflectivity of a coating over a range of wave lengths has a number of important benefits in certain applications. These include better thermal management in devices used to process any variety of materials via heating, such as, for example, an oven that is utilized to cook food.

Porcelain enamel coating materials are well-known and used extensively to coat the interiors of heating devices such as ovens. Examples of such porcelain enamel coating materials and methods for applying such coatings may be found for example in U.S. Pat. Nos. 4,204,021, 4,110,487, 4,085,021 and 3,928,668.

Unfortunately, the ability of conventional porcelain enamel coating materials to reflect radiation is minimal.

SUMMARY OF INVENTION

The present invention provides a new and improved porcelain enamel coating composition that affords a high degree of infrared reflectivity. The coating composition of the present invention is especially well-suited for use in connection with cooking appliances.

In a preferred embodiment the reflective porcelain enamel coating material of the present invention comprises a glass component and a separate and distinct addition of cerium oxide. The glass component includes a composition by weight of from about 0 to 20% $Al_2O_3$, 0 to 20% BaO, 0–30% $B_2O_3$, 0–30% CaO, 0–20% $K_2O$, 0–15% $Li_2O$, 0–20% $Na_2O$, 0–20% $P_2O_5$, 0–30% $Sb_2O_3$, 10–60% $SiO_2$, 0–30% $TiO_2$, 0–20% ZnO, 0–20% $ZrO_2$, 0–5% $CeO_2$ and 0–10% F. The glass component may comprise one or more glass frits so as to provide this overall stated composition. The cerium oxide, which is added, for example, as a mill addition with the glass component, preferably is contained within the composition at a rate by weight percent of from about 0.20% to about 3.0%.

The foregoing and other features of the invention are hereinafter more fully described and particularly pointed out in the claims, the following description setting forth in detail certain illustrative embodiments of the invention, these being indicative, however, of but a few of the various ways in which the principles of the present invention may be employed.

DETAILED DESCRIPTION

The novel porcelain enamel compositions of the present invention are prepared by including based on the weight of the total composition from about 0.20% to about 3.0% by weight cerium oxide in the composition. This level of cerium oxide is separate from any cerium oxide that may be present in the glass component of the composition. The separate and distinct addition of cerium oxide to the composition appears to provide a distinct advantage. Specifically, the use of the cerium oxide addition appears to significantly improve the infrared reflectivity of the coating formed using the coating composition. Use of the reflective coating of the present invention in a heating device, such as a food cooking oven, will result in advantages such as faster cooking times, less energy consumption and even the need for less protective insulation.

The coating composition of the present invention upon firing produces a coating having an infrared reflectivity of at least 50% at 2.5 $\mu$-microns using a Perkin Elmer Lambda 19 UV/VIS/NIR Spectrometer with Labsphere RSA-PE 19 Reflectance Spectroscopy Accessory. A conventional porcelain enamel coating for use in food cooking applications displays an infrared reflectivity of less than about 20%

The porcelain enamel composition preferably comprises from about 50% to about 95% by weight of the glass component. The glass component of the enamel composition may comprise one or more silicate glass frits. Preferably, the glass component provides a composition as follows:

| Oxide | Weight % |
| --- | --- |
| $Al_2O_3$ | 0–20 |
| BaO | 0–20 |
| $B_2O_3$ | 0–30 |
| CaO | 0–30 |
| $K_2O$ | 0–20 |
| $Li_2O$ | 0–15 |
| $Na_2O$ | 0–20 |
| $P_2O_5$ | 0–20 |
| $Sb_2O_3$ | 0–30 |
| $SiO_2$ | 10–60 |
| $TiO_2$ | 0–30 |
| ZnO | 0–20 |
| $ZrO_2$ | 0–20 |
| $CeO_2$ | 0–5 |
| F | 0–10 |

The enamel composition may be utilized in connection with various metal substrates such as low carbon steel, stainless steel and aluminum. However, the present invention is especially well-suited for use on low carbon steel substrates such as those that are typically employed in the appliance business to produce food cooking ovens.

The enamel compositions according to the present invention are suitable for application to a substrate using conventional techniques such as, for example, either dry or a wet application processes. Wet techniques such as dipping and flow coating are well-known as well as electrophoretic application which is discussed in U.S. Pat. Nos. 5,002,903, 4,085,021 and 3,841,986. The disclosures of the '903, '021 and '986 patents are incorporated herein by reference for their teachings relative to the electrophoretic application of porcelain enamel coating compositions. Dry application techniques are also well-known and discussed in U.S. Pat. Nos. 4,110,487 and 3,928,668. The disclosures of the '487 and '668 patents are incorporated herein by reference for their teachings relative to the dry or electrostatic application of porcelain enamel coating compositions.

Whether applied by the wet or dry process, the coating composition of the present invention may be applied directly or indirectly to the metal substrate. Indirect application would involve the primary application of a ground coat or bonding coat. Depending upon the specific application (e.g., pickled or unpickled finished, desired reflectivity, etc.), a ground coat may be required. In general, the coating composition may be applied at a rate of 40 to 80 grams per square foot so as to provide a coating thickness of from about 5 to about 10 mils subsequent to firing.

Articles that have been coated with the coating composition of the present invention may be fired in a conventional manner using conventional firing equipment. Firing is generally conducted at a temperature of 790° C. to about 900° C. for a period of about 3 to about 14 minutes.

The glass frit or frits that comprise the glass component may be prepared utilizing conventional glass melting techniques. A conventional ceramic refractory, fused silica or platinum crucible may be used to prepare the glass frit, molten glass being formed in the crucible and then converted to glass frit using water-cooled rollers and milling equipment. It will be appreciated that the step of producing the glass frits is not per se critical and any of the various techniques well-known to those skilled in the art can be employed.

The glass frits are combined with the cerium oxide and various mill additions. It will be appreciated that the mill additions will vary depending upon the specific application technique being employed. However, for electrophoretic applications the frits may be milled to an aqueous slip in a conventional ball mill and a typical range of mill additions, for example, is as follows:

Wet Enamel Mill Addition for Dipping and/or Flow Coating

| Mill Addition | % By Weight |
|---|---|
| Glass Components (Frits) | 80–100 |
| Clays | 4–7 |
| Cerium oxide | 0.5–3 |
| $TiO_2$ | 0–20 |
| $SiO_2$ | 0–10 |
| Potassium Nitrate | 0–2 |
| Bentonite | 0–2 |
| Magnesium Carbonate | 0–2 |
| Water | 45–49 cc/kg |
| Fineness | 2–3/200 mesh/50 ml. |
| Specific Gravity | 1.70–1.73 |
| Application | 40–60 grams/square foot |

Wet Electrophoretic Mill Addition

| Mill Additives | % By Weight |
|---|---|
| Glass component (Frits) | 80–100 |
| Opacifier ($TiO_2$) | 0–10 |
| Cerium oxide | 0.5–3 |
| Quartz, 325 m. Quartz | 0–10 |
| Colloidal Silica | 0.5–1.5 |
| Bentonite | 0.25–0.50 |

The resultant slip preferably provides a specific gravity of 1.4–1.7, and a fineness range of 3 to 15 ml. retained on a 325 mesh screen from a 50 ml. sample of slurry.

As is well-known in the enamel art, there is a wide range of other acceptable mill agents or components that may also be utilized in the present invention. Also, it must be appreciated that the separate and distinct addition of cerium oxide may be attained by using cerium compounds other than cerium oxide. Specifically, one may utilize any cerium bearing compound that would decompose or oxidize at enameling (firing) temperatures and form cerium oxide. Examples of such compounds include cerium carbonate, cerium boride, cerium fluoride, hydrated cerium oxide and cerium nitrate.

Final firing of the enamel on the deposited workpiece may be carried out by conventional methods and for conventional times and temperatures. For example, firing may be conducted at a temperature of from about 790° C. to about 900° C. for a period of from about 3 to about 14 minutes. However, it will be appreciated that depending upon the specific application, the glass component could be modified to provide a higher or lower firing system that affords good reflectivity by virtue of the cerium oxide addition.

It will be appreciated that products coated with enamel compositions made in accordance with the present invention have good color and gloss even when applied using electrophoretic deposition techniques. The fired appearance of the final coating is smooth and uniform and substantially free of ripples or curtaining. Additionally, enamel coatings made in accordance with the present invention are color stable and resistant to chemical attack (acid resistance) and they display good resistance to the adhesion of food soils.

The following examples are intended only to illustrate the invention and should not be construed as imposing limitations upon the claims.

EXAMPLE I

Frit compositions A–E having the following compositions were prepared using conventional glass melting techniques.

Weight Percent

| Oxide | A | B | C | D | E |
|---|---|---|---|---|---|
| $B_2O_3$ | 15.61 | 15.61 | 15.84 | 19.54 | 15.98 |
| $K_2O$ | 6.80 | 6.85 | 6.93 | 8.56 | 7.00 |
| $Na_2O$ | 8.51 | 8.59 | 8.74 | 10.77 | 8.80 |
| $P_2O_5$ | 2.29 | 2.29 | 0.00 | 2.85 | 0.00 |
| MgO | 0.49 | 0.45 | 0.47 | 0.56 | 0.00 |
| $SiO_2$ | 44.70 | 44.89 | 45.54 | 56.16 | 45.98 |
| $TiO_2$ | 20.80$_{(1)}$ | 20.08$_{(2)}$ | 21.23$_{(1)}$ | 0.00 | 22.24$_{(1)}$ |
| ZnO | 0.00 | 0.43 | 0.42 | 0.55 | 0.00 |
| $ZrO_2$ | 0.80 | 0.80 | 0.82 | 1.00 | 0.00 |
| Subtotal | 100.00 | 99.99 | 99.99 | 99.99 | 100.00 |
| F | 4.00 | 3.07 | 0.00 | 3.84 | 0.00 |
| $NO_2$ | 2.50 | 2.53 | 2.56 | 3.16 | 2.58 |

Note:
$_{(1)}$Frit makers anatase, $_{(2)}$Rutile

EXAMPLE II

Porcelain enamel coating compositions were prepared using the glass frits A, B, C, D and E of Example I to provide compositions I, II, III, IV and V. In each case the components were ground in a ball mill in a conventional manner until 2 to 15 grams were retained on a 325 mesh screen from a 50 cubic centimeter sample.

| Component | % By Weight Sample | | | | | |
|---|---|---|---|---|---|---|
| | I | II | III | IV | V | VI |
| Frit A | 100 | 100 | | | | |
| Frit B | | | 100 | | | |
| Frit C | | | | 100 | | |
| Frit D | | | | | 100 | |
| Frit E | | | | | | 100 |
| *P/N 5300 Cerium oxide concentrate | 1 | 1 | 1 | 1 | 1 | 1 |
| Titanium Dioxide** | 0 | 10 | 0 | 0 | 0 | 0 |
| Clay | 4 | 4 | 4 | 4 | 4 | 4 |
| Potassium nitrate | 0.125 | 0.125 | 0.125 | 0.125 | 0.125 | 0.126 |
| Bentonite | 0.250 | 0.250 | 0.250 | 0.250 | 0.250 | 0.250 |
| Water (Milliliters per 100 grams of frit) | 45 | 45 | 45 | 45 | 45 | 45 |

*Available from MolyCorp, Inc. comprising typically 55% $CeO_2$, 0.5–2% SrO, 5–10% CaO, 5–9% BaO, 6–10% F and 2–6% $P_2O_5$.
**Available from Kemira, Inc. comprising titanium dioxide 92–100%, aluminum hydroxide 0–8%, silica (amorphous) 0–8%.

% By Weight Sample

EXAMPLE III

The enamel compositions I, II, III, IV and V of Example II were applied on ground coated panels with a wet application of 40 to 80 grams per square foot by conventional wet spraying and dried in a convection oven at about 150 degrees Celsius. The samples were then fired at about 870° C. for 6 minutes. The samples displayed the following properties:

| Sample | Properties<br>Infrared Reflectivity at 2.5 u-micron<br>(Perkin Elmer Lambda 19 UV/VIS/NIR Spectrometer with Labsphere RSA-PE 19 Reflectance Spectroscopy Accessory) |
|---|---|
| I | 80% for Sample fired at 1600° F./6 minutes |
| II | 80% for Sample fired at 1600° F./6 minutes |
| III | 60% for Sample fired at 1600° F./6 minutes |
| IV | 64% for Sample fired at 1600° F./6 minutes |
| V | 60% for Sample fired at 1600° F./6 minutes |
| VI | 56% for Sample fired at 1600° F./6 minutes |

While the invention has been explained in relation to its preferred embodiments, it is to be understood that various modifications thereof will become apparent to those skilled in the art upon reading this specification. Therefore, it is to be understood that the invention disclosed herein is intended to cover such modifications as fall within the scope of the appended claims.

What is claimed:

1. A porcelain enamel coating composition for use in forming an infrared reflective coating on a substrate, said composition comprising a glass component, said glass component comprising one or more glass frits, and a cerium oxide component which is separate and distinct from any cerium oxide which may be present in said glass component, said cerium oxide component comprising from about 0.2 to about 3.0% of said composition by weight, said composition subsequent to firing producing an enamel coating which displays an infrared reflectivity of at least 50% at $2.5\mu$ measured with a Perkin Elmer Lambda 19 UV/VIS/NIR spectrometer with a Labsphere RSA-PE 19 reflectance spectroscopy accessory.

2. A porcelain enamel coating composition as in claim 1 wherein said cerium oxide component comprises a cerium bearing compound which decomposes or oxidizes during firing to form cerium oxide.

3. A porcelain enamel coating composition as in claim 2 wherein said cerium bearing compound is one or more compounds selected from cerium oxide, cerium carbonate, cerium boride, cerium fluoride, hydrated cerium oxide, or cerium nitrate.

4. A porcelain enamel coating composition as in claim 1 wherein said glass component comprises one or more silicate frits.

5. A porcelain enamel coating composition as in claim 1 wherein said glass component comprises by weight from about 0 to about 20% $Al_2O_3$, from about 0 to about 20% BaO, from about 0 to about 30% $B_2O_3$, from about 0 to about 30% CaO, from about 0 to about 20% $K_2O$, from about 0 to about 15% $Li_2O$, from about 0 to about 20% $Na_2O$, from about 0 to about 20% $P_2O_5$, from about 0 to about 30% $Sb_2O_3$, from about 10 to about 60% $SiO_2$, from about 0 to about 30% $TiO_2$, from about 0 to about 20% ZnO, from about 0 to about 20% $ZrO_2$, from about 0 to about 5% CeO, and from about 0 to about 10% F.

6. A porcelain enamel coating composition as in claim 1 wherein said glass component comprises from about 50 to about 95% by weight of said composition.

7. A porcelain enamel coating composition as in claim 1 further comprising one or more mill additions selected from clay, titanium dioxide, silica, potassium nitrate, bentonite, magnesium carbonate, or quartz.

8. A porcelain enamel coating composition as in claim 1 wherein said composition subsequent to firing produces an enamel coating which displays an infrared reflectivity of at least 56% at $2.5\mu$ measured with a Perkin Elmer Lambda 19 UV/VIS/NIR spectrometer with a Labsphere RSA-PE 19 reflectance spectroscopy accessory.

9. A porcelain enamel coating composition as in claim 1 wherein said composition subsequent to firing produces an enamel coating which displays an infrared reflectivity of at least 60% at $2.5\mu$ measured with a Perkin Elmer Lambda 19 UV/VIS/NIR spectrometer with a Labsphere RSA-PE 19 reflectance spectroscopy accessory.

10. A porcelain enamel coating composition as in claim 1 wherein said composition subsequent to firing produces an enamel coating which displays an infrared reflectivity of at least 64% at $2.5\mu$ measured with a Perkin Elmer Lambda 19 UV/VIS/NIR spectrometer with a Labsphere RSA-PE 19 reflectance spectroscopy accessory.

11. A porcelain enamel coating composition as in claim 1 wherein said composition subsequent to firing produces an enamel coating which displays an infrared reflectivity of 80% at $2.5\mu$ measured with a Perkin Elmer Lambda 19 UV/VIS/NIR spectrometer with a Labsphere RSA-PE 19 reflectance spectroscopy accessory.

* * * * *